United States Patent [19]

Landsman

[11] 4,139,243
[45] Feb. 13, 1979

[54] PROTECTIVE SYSTEM FOR A PNEUMATICALLY ACTUATED ROTATING BODY

[75] Inventor: Robert M. Landsman, Annandale, Va.

[73] Assignee: LogEtronics, Inc., Springfield, Va.

[21] Appl. No.: 753,673

[22] Filed: Dec. 23, 1976

Related U.S. Application Data

[62] Division of Ser. No. 645,583, Dec. 31, 1975.

[51] Int. Cl.$^2$ ............................................. F16C 32/06
[52] U.S. Cl. ........................................ 308/9; 188/67; 308/1 A; 308/DIG. 1
[58] Field of Search .................... 308/5 R, 9, 1 A, 35, 308/DIG. 1, 122; 188/67

[56] References Cited
U.S. PATENT DOCUMENTS

| | | | |
|---|---|---|---|
| 3,063,041 | 11/1962 | Quade et al. | 308/DIG. 1 |
| 3,491,529 | 1/1970 | Kerr et al. | 308/9 |
| 3,611,697 | 10/1971 | Greb | 308/9 |

*Primary Examiner*—Charles E. Frankfort
*Attorney, Agent, or Firm*—William D. Hall; Geoffrey R. Myers

[57] ABSTRACT

A hollor tubular shaft containing optical elements for a laser-type facsimile transceiver employing helical scanning is horizontally supported by air bearings, and translated along its major axis by means of a piston and pneumatic cylinder coaxial with the shaft. An integral reaction-powered air motor provides shaft rotation, and a fail-safe automatic control and braking system prevents damage to the scanning mechanism in the event of interruption of the pneumatic or electrical supplies by permitting physical shaft-to-bearing contact only in the absence of shaft rotation and translational motion. The apparatus finds particular utility in the production of printing plates for use in the Graphic Arts.

7 Claims, 5 Drawing Figures

PROTECTIVE SYSTEM FOR A PNEUMATICALLY ACTUATED ROTATING BODY

RELATED APPLICATION

This application is a division of my prior copending application, Ser. No. 645,583, filed Dec. 31, 1975, entitled "Pneumatically Actuated Image Scanning Reader/Writer".

BACKGROUND OF THE INVENTION

My U.S. Pat. No. 3,816,659 issued June 11, 1974 for "Scanning Apparatus", which is now assigned to the assignee of this application, discloses an earlier apparatus suited to either the reading or writing of graphic and other indicia by a facsimile method, and the following patents refer to air or hydrostatic bearing systems:

Adams, U.S. Pat. No. 3,432,213, issued Mar. 11, 1969, for "Self-leveling Air Bearing Fixture".

Bruck, U.S. Pat. No. 3,806,208, issued Apr. 23, 1974, for "Hydrostatic Bearing Systems".

It is well-known that rotating bodies may be supported by air bearings. In such devices, the rotating body is supported by compressed air. It is also known that a brake may be applied to the rotating body in order to slow or stop its motion. However, in the prior art, the brake has been applied to the periphery of the rotating body in a direction perpendicular to the axis of the body. This, of course, may cause problems because when the body is stopped by the braking action, there is a tendency for it to strike the stationary supporting structure (from which the compressed air is ejected). In a system which requires a high degree of accuracy in the position of the rotating body over a period of years, it is very undesirable to have the rotating body engage the fixed support while the body is still in motion.

SUMMARY OF THE INVENTION

The problems described above are solved by having a cylindrical rotating body pneumatically supported by air bearings. A braking surface is attached to the rotating body and is perpendicular to the axis of rotation of the cylinder. A stationary braking surface adjacent to, and parallel to, the first-named braking surface, is also provided. The two braking surfaces are normally spaced apart.

When it is desired to apply braking action, air pressure is applied to move the two braking surfaces into contact to thus slow or stop the rotating body. The fail-safe system is so arranged that motion of the rotating body is stopped before the body is allowed to come into physical contact with the stationary supporting structure.

DESCRIPTION OF THE PREFERRED EMBODIMENT

Figure 1:
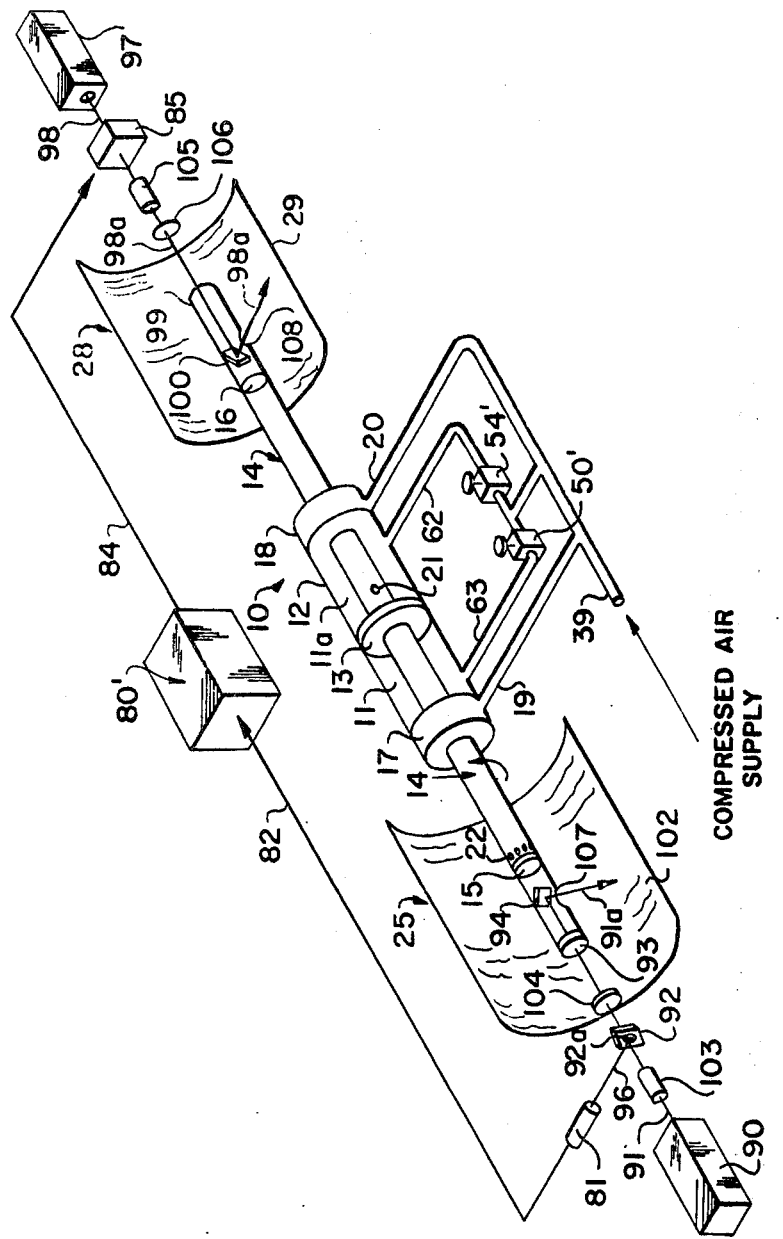
FIG. 1 is a perspective view of one possible embodiment of the facsimile apparatus of the pressure invention.

FIG. 1 illustrates a simplified facsimile apparatus, or "electronic camera", constructed in accordance with one form of the present invention wherein graphic or other indicia may be transferred electro-optically, by synchronous helical scanning in real time, from a reading station to a recording material contained in an adjacent image reproducing station within the apparatus. The optomechanical portion of the system is comprised of three major components, each of generally cylindrical configuration, namely: a copy reading station 25; a pneumatically-actuated scanning drive system 10; and an image writing station 28; all of which are assembled in horizontal end-to-end relationship and aligned about a single mechanical and optical axis.

Referring first to the scanning drive system 10, a pneumatic cylinder 12 is substantially closed at its ends by conventional annular air bearings 17, 18 (such as is shown in U.S. Pat. No. 3,622,222 to C. E. Remy et al, issued Nov. 23, 1971 for "Apparatus For Scanning Photographic Negatives" or U.S. Pat. No. 3,063,041, issued Nov. 6, 1962 to Edward A. Quade et al, for "High Speed Reaction Drum", or Model No. B-2348, of Dover Instrument Corp. Waltham, MA.) which, when energized by compressed air supplied from an external pneumatic source (not shown) over lines 39, 19 and 20 provide essentially friction-free support for an elongated, tubular optical scanning member 14 to the midpoint of which there is secured, in substantially friction-free pneumatic pressure sealing relationship with the interior wall of cylinder 12, a disc-shaped piston or pressure plate 13. When the air bearings are adequately pressurized they support member 14 and render it free to rotate and/or translate axially within cylinder 12, and also minimize the escape of air laterally therefrom.

Air line 39 also supplies compressed air via control valves 50', 54' and lines 63, 62 to chambers 11, 11a (separated by piston 13) of pneumatic cylinder 12, where it effects axial translation of shaft member 14 through bearings 17, 18 and provides motive power for rotation of the shaft. Within drive system 10 the hollow shaft 14, which is sealed by internal airtight barriers 15, 16 is powered for smooth rotation about its major axis by an integral air motor 22 which receives compressed air from chamber 11a of cylinder 12 via manual control valve 54', adjustment of which varies the speed of shaft rotation. The air is introduced into member 14 through entry orifice 21 and is vented to the atmosphere only through a circumferential ring of jet-producing holes 22, each inclined tangentially with respect to radii of shaft 14 to provide the reaction torque which rotates the shaft at a speed which is a function of the applied air pressure.

Figure 3:
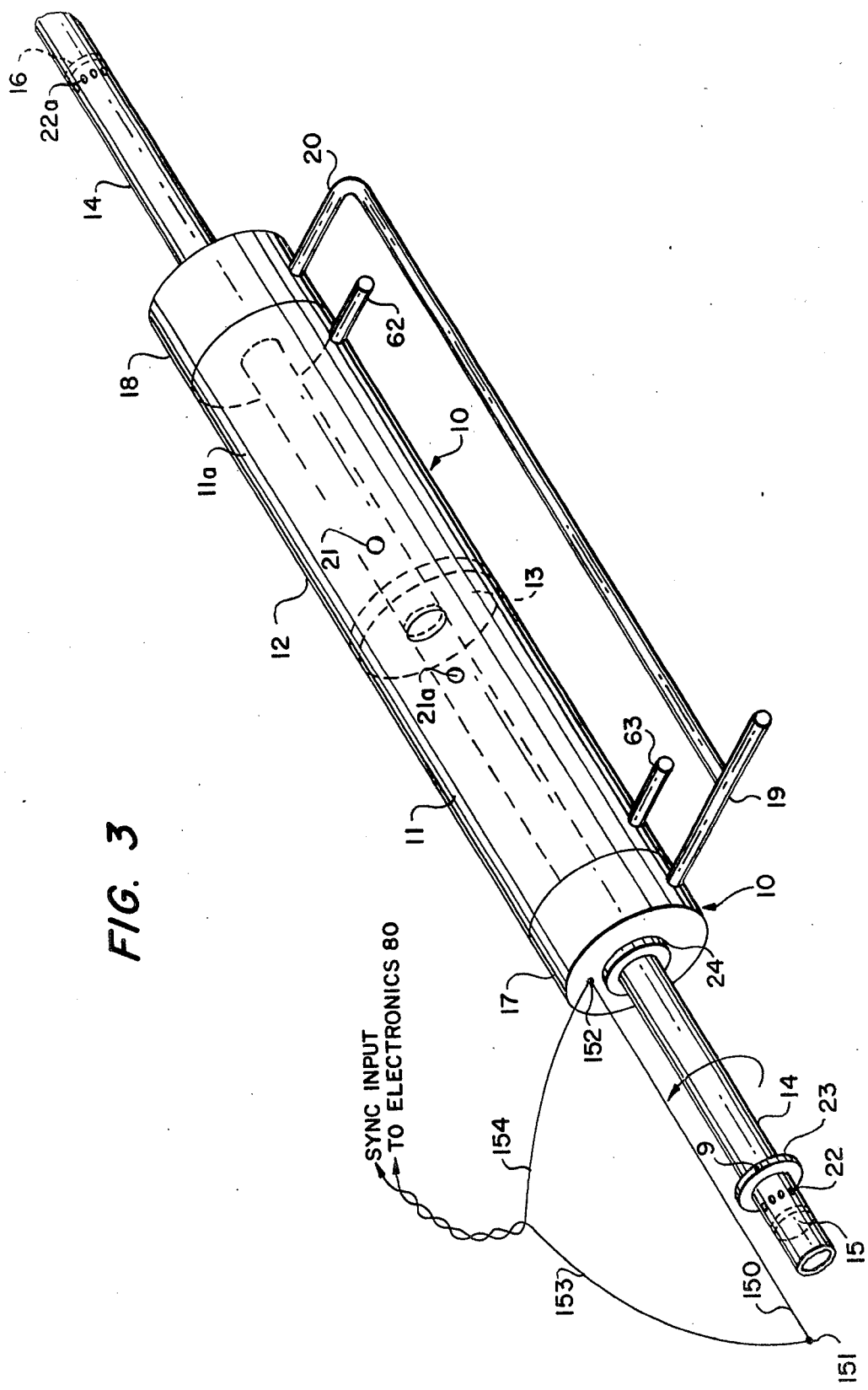
FIG. 3 is a perspective view of a modified form of the scanning drive system of the present invention, incorporating dual air motors.

Prior to commencing a scanning operation the pneumatic pressure in chamber 11a of cylinder 12 is adjusted, by manipulation of valve 54', to obtain the desired speed of rotation of shaft 14 while, simultaneously, the pressure in chamber 11 is similarly changed—by adjustment of valve 50'—to prevent translational motion of the shaft. In order to execute a scanning operation from right to left, for example, the pressure in chamber 11 must be progressively reduced, by continuous adjustment of valve 50', to enable piston 13 to move at the desired rate of line advance from its initial position in the vicinity of bearing 18 to a final position in the vicinity of bearing 17, thereby causing indicia-bearing material 102 to be helically scanned by the beam 91a of reading radiation in station 25. Shaft 14 may then be returned to its initial position, or to any desired, intermediate translational position, by increasing the pressure in chamber 11 to counterbalance the steady pressure in chamber 11a. A somewhat similar translational mechanism is shown in Bruck, U.S. Pat. No. 3,806,208, issued Apr. 23, 1974 for "Hydrostatic Bearing Systems." Furthermore, and as is shown in FIG. 3, it would be possible—if required—to provide shaft 14 with an additional air-entry orifice 21a on the left side of piston 13 and a second air motor 22a near the opposite end of shaft 14, in order to produce a rotational system having more precisely balanced pneumatic characteristics.

Figure 4:
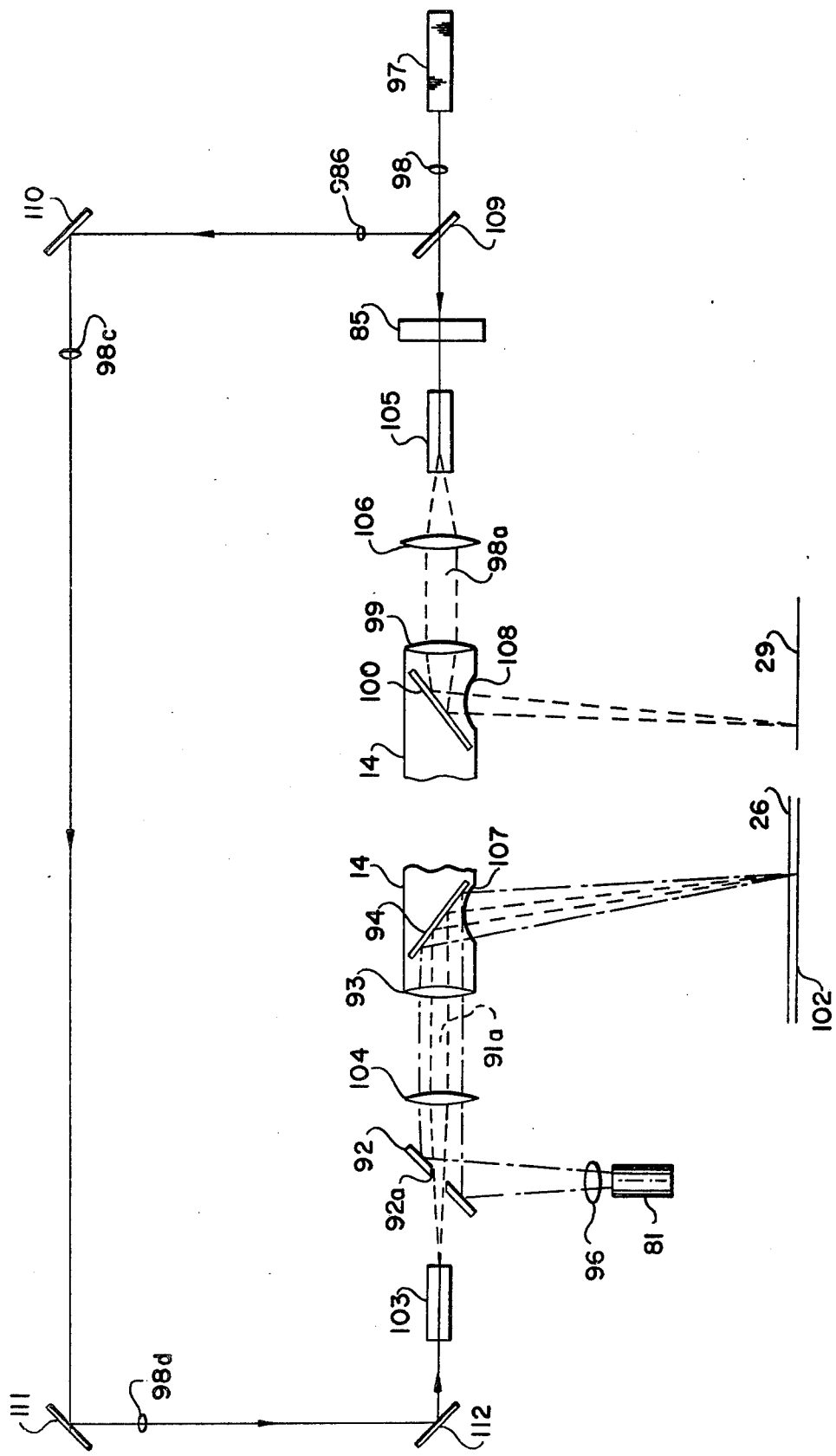
FIG. 4 is a schematic diagram of a modified form of the optical configuration for use in the apparatus of FIG. 1 or FIG. 2.

Copy reading station 25 contains an elongated, arcuately-shaped platen (not shown) for supporting a sheet 102 bearing line or halftone indicia at the focal point of the optical reading system. The beam of copy reading radiation 91 from a light source such as helium-neon laser 90 is aligned axially with that end of member 14 which extends into reading station 25 and, after slight broadening due to its passage through beam expander 103 (such as Model B-34-60 of Oriel Corp., Stamford, CONN.), beam 91 passes through the central aperture 92a in angled mirror 92 and is collimated by lens 104, thereby minimizing variations in the focal point of the scanning spot as member 14 translates. The collimated beam 91 is focused on the front surface of copy 102 by means of a lens 93 and angled mirror 94, both of which are mounted inside scanning member 14. As is best shown in FIG. 4, mirror 94 is set at an angle other than 45° to the common optical axis in order to minimize the response of photodetector 81 to specular reflections from the front surface of copy 102, and an angle of 52° has proven satisfactory for this purpose. Mirror 94 reflects beam 91a radially through a transparent aperture 107 in the sidewall of member 14, enabling it to impinge upon copy 102.

A portion of the light from beam 91a, after being modulated in intensity by variations in the reflectivity of copy sheet 102, is re-received by mirror 94, collimated by lenses 93 and 104, and intercepted and reflected by the annular portion of angled mirror 92 along path 96 to reading photodetector 81, where it is converted into a varying video signal on conductor 82 of electronic system 80'. An alternate copy reading optical system capable of providing an image of enhanced contrast at photodetector 81 may employ a laser 90 having a polarized radiation beam (such as Model 3124 H-P of Hughes Aircraft Corp., Torrance, CA.), in which event annular mirror 92 is replaced by a polarizing beam splitter cube (such as Part No. 675-3405 of Perkin-Elmer Corp., Norwalk, CT.).

Within electronic circuit 80' the video signals received over conductor 82 from photodetector 81 as a result of helical scanning of the line-type indicia present on copy sheet 102 are amplified by a conventional video amplifier, and then fed over conductor 84 to an acousto-optical light modulator 85 (such as Model DLM-1-IR of Datalight, Inc., Bloomfield, CT.) which is located in the path of an image writing radiation beam 98 generated by a laser 97 having a spectral output and power density suited to the non-linear imaging characteristics of material 29 (such as the offset lithographic printing plate described in my co-pending U.S. patent application Ser. No. 459,039 "Printing Plate Blank and Image Sheet by Laser Transfer" filed Apr. 8, 1974 and now U.S. Pat. No. 3,945,318, issued Mar. 23, 1976).

The modulated radiation beam emerging from modulator 85 is broadened slightly by its passage through beam expander 105, and is collimated by lens 106. The collimated beam 98a is then directed along the axis of scanning member 14 and refocused by lens 99 on the radiation responsive material 29 for recording thereon a representation of the graphic indicia contained on copy sheet 102. An intervening mirror 100, which is positioned angularly as taught by my previously-mentioned U.S. Pat. No. 3,816,659, is used to reflect beam 98a radially through a transparent aperture 108 in the sidewall of member 14.

While the apparatus of FIG. 1 performs the basic electronic image dissection, transfer and reconstruction functions which characterize the facsimile art, its operating efficiency and commercial utility are compromised by the need for manual adjustment of valve 50' in order to control the translational motion of shaft 14; by its ability to write only those line and halftone images which are customarily reproduced by lithographic and other high-contrast reproduction processes; and by its inability to operate in synchronism with similar reader/writer apparatus in a facsimile mode. All of these deficiencies are overcome in the preferred apparatus shown in FIG. 2 wherein electropneumatic servo systems provide accurate automatic control of the linear translation and speed of rotation of scanning shaft 14, and the electronic system 80 is capable of processing the video signals from detector 81 to suit the characteristics of line, halftone, continuous tone or other indicia 102, which may be reproduced on any one of a wide variety of image receptive materials 29 such as silver halide, diazo, or those described in the following disclosures:

Landsman, U.S. Pat. No. 3,739,088 issued June 12, 1973, entitled "Printing Plate Production Method and Apparatus", Landsman, U.S. Pat. No. 3,742,853 issued July 3, 1973, entitled "Method of Forming Relief Printing Plate", Landsman, U.S. Pat. No. 3,779,779 issued Dec. 18, 1973, entitled "Radiation Etchable Plate", German Offenlegungschriften DT No. 2500-905, filed July 24, 1975, German Offenlegungschriften DT No. 2500-906, filed July 24, 1975.

The improved apparatus is capable of operating from composite video and synchronizing data received over conductor 83 from an external computer or memory storage means, or from similar external image scanning reader/writer apparatus; and of feeding internally generated video and synchronizing data over conductor 89 to a compatible device such as, for example, a duplicate remotely located reader/writer.

Figure 2:
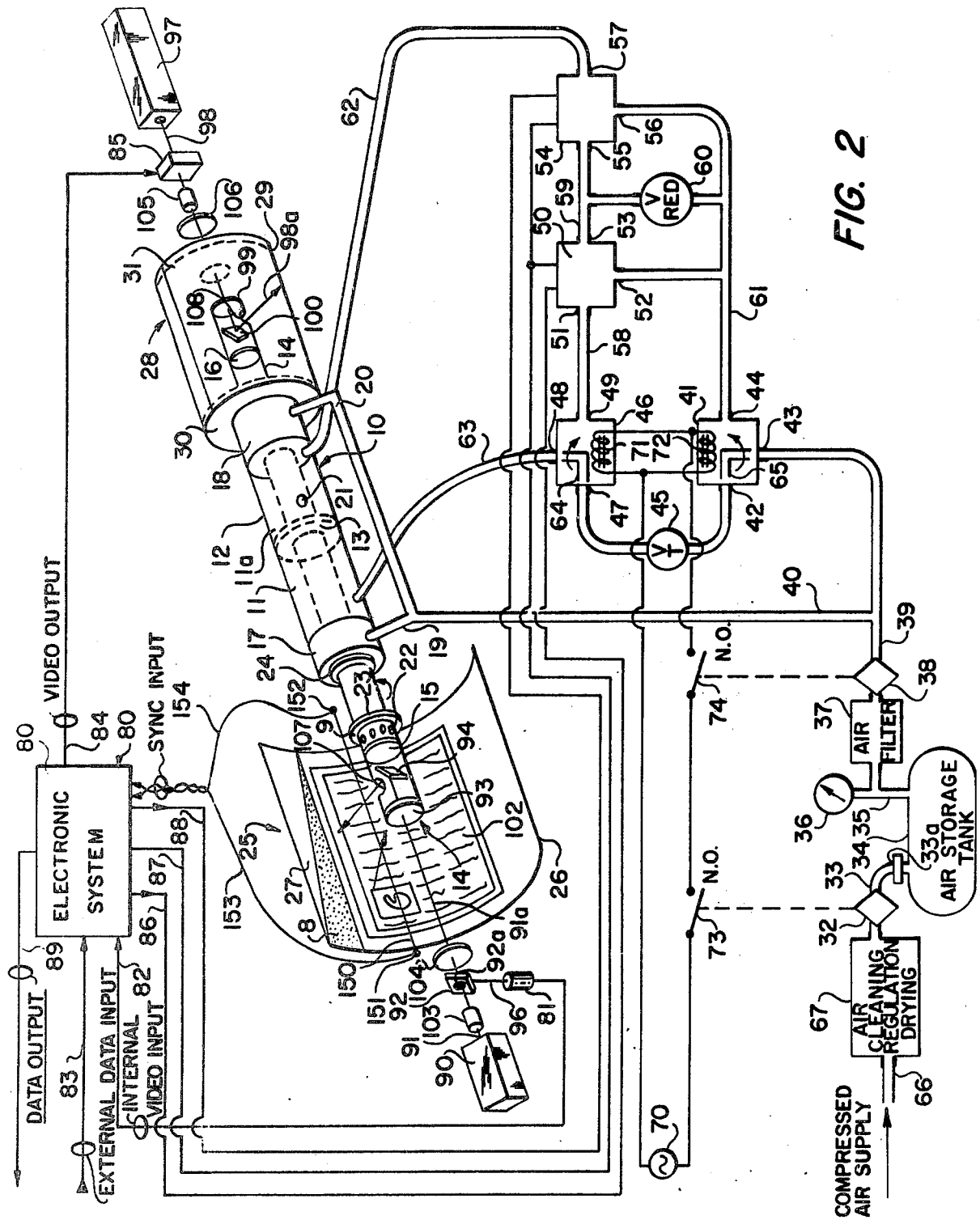
FIG. 2 is a perspective view of a system incorporating the present invention.

The copy reading station 25 of FIG. 2 contains elongated, arcuately shaped supporting structures for the material to be scanned, and includes a rectangular encoding pattern which is divided diagonally to form two optically contrasting triangles 27, 8. Also located in station 25 is a flexible, optically transparent cover sheet 26 behind which the line, halftone, textual or other copy material 102 is secured, by means not shown, for scanning by laser beam 91a. As is generally disclosed in my previously mentioned U.S. Pat. No. 3,816,659, the encoding pattern 27, 8 provides reflective signals to photodetector 81 which define the translational and rotational rates of scanning member 14.

Station 25 also contains a magnetically operated synchronizing pulse source in the form of an electrical conductor 150 supported under tension between fixed terminal points 151, 152 and connected, via lines 153, 154 to electronic system 80. Conductor 150 is positioned proximate to the translational path of a small permanent magent 9 embedded in the periphery of a brake ring 23 which is mounted on rotary scanning shaft 14, so that the once-per-revolution current pulse induced in conductor 150 by magnet 9 occurs simultaneously with the passage of reading laser beam 91a over the upper edge of encoder pattern 27, thereby providing a time reference signal which identifies the commencement of each scan line of the video data generated by photodetector 81.

At image writing station 28 the stationary circular end plates 30, 31 by means of which the edges of a flexible sheet of image receptive material 29 are retained, aligned and supported to form either a partial or complete cylinder, are each provided with a central, circular aperture through which scanning member 14 is free to translate during operation of the apparatus.

In FIGS. 1 and 2 it is to be understood that lens 93, mirror 94, aperture 107, barrier 15, motor orifices 22, brake ring 23, piston 13, air orifice 21, barrier 16, mirror 100, aperture 108 and lens 99 are all fixed to, or parts of, tubular scanning shaft 14 and rotate as well as translate with member 14. All other parts of the apparatus are normally stationary and are supported in fixed relation to each other. Finally, it is possible to modify the optical system to enable the reading and writing functions to be performed by a single laser, if required, by employing the optical configuration shown in FIG. 4 wherein a small portion 98b of the radiation beam 98 of laser 97 is diverted, by means of the beam splitting mirror 109 and a secondary optical path including mirror 110, 111 and beams 98c, 98d to mirror 112 where it can perform a function similar to that of beam 91 associated with reading laser 90, as previously described with reference to FIG. 1.

Turning now to the pneumatic control system for member 14 in FIG. 2, it can be seen that compressed air supplied by a source external to the apparatus is introduced through input air line 66 and passes through a sequence of air cleaning, drying and pressure regulating devices shown generally at 67. The conditioned air then travels through a first pneumatic pressure-controlled switch actuator 32 provided with normally-open electrical switch contacts 73 which are set to close at and above a desired pressure (such as 60 PSIG) and charges air storage tank 34 over line 33 via check valve 33a. Tank 34 is equipped with an output air line 35 having a dial-type pressure gauge 36, a final air filter 37, and a second pneumatic pressure-controlled switch actuator 38 provided with normally-open electrical switch contacts 74 set to close whenever the pressure in output line 39 reaches or exceeds a desire value (such as 55 PSIG).

Each time the apparatus is placed in its start-up mode the pressure in air line 40 gradually increases until air bearings 17, 18 become activated via lines 19, 20 thereby elevating scanning member 14 to a free position as previously described. Compressed air is also supplied via line 39 to the input port 43 of a first bi-directional air control valve 41 (such as the Model A3DB2 127 of Skinner Electric Valve Company, New Britain, CT.) actuated by an electric solenoid 72, where it flows through air diverter means 65 to a first output port 42. Port 42 is connected, by means of a manually-adjustable preset throttle valve 45, to a first input port 47 of a second two-way air valve 46 actuated by electric solenoid 71, where the air flows through air diverter means 64 to output port 48. Air from port 48 then flows through line 63 to pressurize chamber 11 of pneumatic cylinder 12. The resulting pressure gradient generated between chambers 11, 11a acts on piston 13, causing scanning member 14 to translate toward writing station 28 until its metallic brake ring 23 seats against stationary brake pad 24, thereby arresting member 14. Because the air in chamber 11a is at approximately room ambient pressure at this time, the rate at which member 14 translates is governed by the preadjusted degree of opening of throttle valve 45.

When the air pressure at the input and output of storage tank 34 reaches a desired value such as 60 PSIG, the normally-open series-connected switches 73 and 74 associated with pneumatic actuators 32, 38 respectively, close and complete an electrical circuit from power source 70 to the parallel-connected solenoid coils 71, 72 of air-control valves 46, 41. The energization of these coils causes air diverters 64, 65 to assume their alternate positions, establishing new air paths to cylinder 12. A first such air path includes line 39, diverter 65 and ports 43, 44 of valve 41, and line 61 which supplies the first input ports 52, 56 of current-to-pressure transducers 50, 54 (such as the Model T 5120-1 of Fairchild Instruments, Winston-Salem, N.C., each of which contains an electrically-modulated pilot valve and a pneumatically-controlled booster valve, coupled in tandem) as well as the high-pressure side of reduction valve 60. Pressure modulated air from port 51 of transducer 50 is fed over line 58 to a second input port 49 of valve 46, where it passes through diverter 64, output port 48, and line 63 and flows into chamber 11 of cylinder 12. A second air path from line 61, through ports 56, 57 of current-to-pressure tranducer 54, supplies modulated air over line 62 to pressurize the remaining chamber 11a of cylinder 12, thereby also supplying pressurized air to air motor orifices 22 via air entry hole 21 and enabling scanning member 14 to commence rotation as soon as it has translated (due to the rising pressure differential between chambers 11a and 11) sufficiently far toward reading station 25 to disengage brake means 23, 24.

Transducers 50, 54 electro-mechanically modulate the pneumatic pressures applied to chambers 11, 11a of cylinder 12 in order to control the translation and speed of rotation of scanning member 14. The associated electrically-controlled pilot valves are fed with air at about 20 PSIG via reduction valve 60, line 59 and second input ports 53, 55 and the transducers exhibit an overall pneumatic sensitivity of approximately 27 PSI per milliampere of input control current applied from the electronic system 80 via conductors 86, 87 and 88 respectively.

In the event of a sustained interruption of either the incoming electrical power or the pneumatic supply source, or the simultaneous failure of both, a fail-safe system which includes tank 34 will continue to furnish pressurized air to cylinder 12 and air bearings 17, 18 for several minutes, enabling the rotation of member 14 to be brought to a stop before it makes physical contact with the air bearings. The sequence of events following an electrical power failure only, or a combined electrical and pneumatic supply failure, is as follows:

a. Solenoid coils 71, 72 immediately become de-energized and cause valves 46, 41 to return to their initial positions, thereby removing the air supply from lines 61, 62 and coupling line 63 direct to line 39 to unbalance the pressure differential between chambers 11, 11a of cylinder 12.

b. Member 14 then translates toward writing station 28 until brake 23, 24 becomes energized, thereby stopping its rotary and translational motion.

c. Member 14 remains supported within air bearings 17, 18 until the pressure in line 39 falls almost to the room ambient pressure, at which time it settles gently into physical contact with these bearings.

Figure 5:
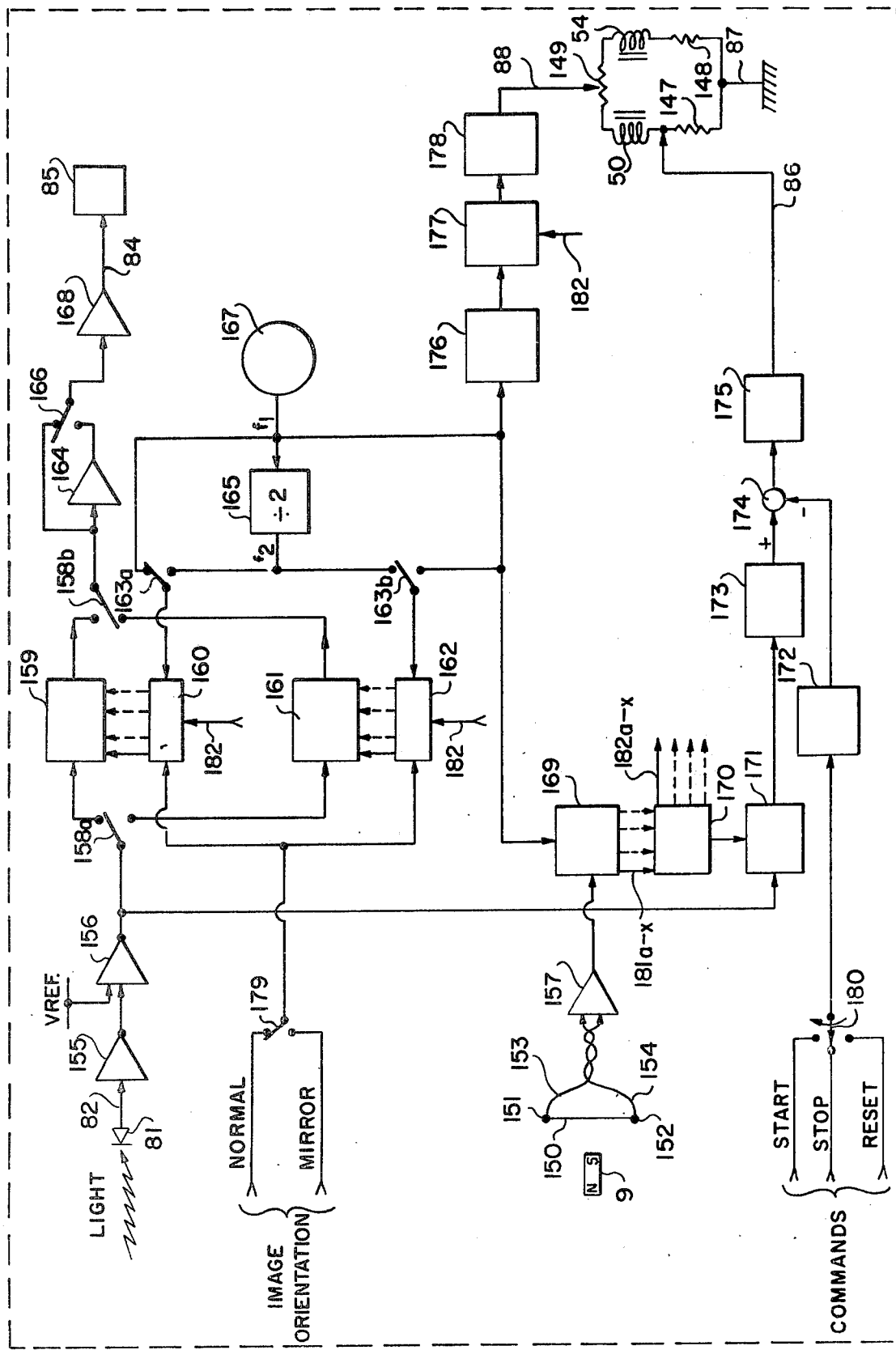
FIG. 5 is a block diagram of the electronic system shown in the perspective view of FIG. 2.

In the electronic system 80 of FIG. 2, which is shown in block diagram form in FIG. 5, the line-by-line video signals generated by photodetector 81 as a result of sequential reflective scanning of the optical encoding pattern 27, 8 and line-type copy 102 in reading station 25, are amplified by preamplifier 155 to an amplitude such as 5 volts peak-to-peak and then applied to one input of a voltage comparator 156. A fixed reference voltage $V_{ref}$, such as 2.5 volts, is the second input to comparator 156, so that when the video input signal amplitude exceeds $V_{ref}$ an output signal level of about 5 volts is provided, whereas when the input signal is less than $V_{ref}$ the comparator output voltage is essentially zero. Thus, the output of comparator 156 is a sequence of voltage transitions which constitute a quantized electrical representation of the two different reflectivity levels exhibited by the line-type copy 102 scanned by reading laser beam 91a.

As was explained heretofore, a magnet 9 mounted on scanning shaft 14 rotates in close proximity to conductor 150 and generates therein a once-per-revolution pulse voltage which is conveyed by conductors 153, 154 to the input of synchronizing pulse amplifier 157. The amplified pulse is used to reset counter 169, driven by clock 167, to zero at the commencement of each scan line over pattern 27, 8 and copy 102, so that if shaft 14 is rotating at a constant speed counter 169 will count through a series of numbers each one of which will uniquely identify one particular angular position of shaft 14 and laser beam 91a. Such output signals are delivered over individual ones of a multiplicity of output conductors identified as 181a–x.

The program logic array 170 is driven by signals received from counter 169 over appropriate ones of conductors 181a–x and contains a predetermined series of numbers. Array 170 provides an output signal, on an appropriate one of a group of output conductors identified as 182a–x, whenever coincidence is obtained between a count received from counter 169 and one of the preset numbers contain within logic array 170. These signals are used individually to control the functioning of each circuit which is required to operate in synchronism with an instantaneous angular position of shaft 14, such as the scan line starting and stopping positions at which video data is to be read into the dual memory storage 159 or 161 via address counter 160 or 162 and electronic selector switches 158a and 163a or 163b; the time during which video data is to be read from memory via electronic selector switches 158b and 163a or 163b; the rotational error signal derived from shaft 14, which is fed over conductor 182 to phase detector 177 for control purposes; and the enabling signal for application to synchronizing gate 171 whenever laser beam 91a is traversing the triangular encoding pattern located in the focal plane of reader 25.

Quantized composite video signals from voltage comparator 156, and the enabling signal from program logic array 170, are applied to the inputs of synchronizing gate 171, and the resulting separated output (in the form of encoder pattern signals only) is coupled to a pulse-width-to-voltage converter 173 which develops an output voltage proportional to the ratio between the durations of the two signals generated by photodetector 81 as the adjacent optically-contrasting segments of encoding pattern 27, 8 are scanned by laser beam 91a. This output voltage, which varies as a function of the linear position of beam 91a relative to pattern 27, 8 is summed at junction 174 with a reference voltage, provided by ramp generator 172, which varies linearly with time and is initiated by a "start" command received from the equipment operator, via switch 180, at the commencement of each complete scanning sequence. The resulting error signal is amplified and filtered by a circuit 175 which embodies the phase-locked loop principles described in Technical Bulletin AN-535 (Motorola Inc., Phoenix, AZ) and provides an output control current on conductor 86 which is applied to electro-pneumatic transducer 50 to modulate the air pressure differential between chambers 11, 11a of cylinder 12 in a direction which will minimize any error in the translational position of scanning member 14 relative to encoder pattern 27, 8 and copy sheet 102. In the event that the dual air motor configuration shown in FIG. 3 is incorporated in shaft 14 it would be advantageous to add a unity-gain inverting amplifier having its input connected to the junction of transducer coil 50 and resistor 147, and its output connected to the junction of transducer coil 54 and resistor 148, in order to minimize any pneumatic interaction between the rotary and translational control loops which might otherwise result.

Each of the electronic switches 158a, 158b and 163a, 163b is operated in synchronism with alternate revolutions of scanning shaft 14 to enable, for example, a complete scan line of quantized video data to be read into memory 159 while, concurrently, the preceding line of video data is being read out of memory 161 to drive the acousto-optical modulator 85 as previously described. The lines of video data are generated at a rate which is a combined function of the resolving power and angular velocity of laser beam 91a and the radius of curvature of copy 102 in station 25, and are read into the selected memory via switch 158a at a rate (such as 9 megabits/sec.) derived from data clock 167 via switches 163a or 163b. Similarly, and provided that the radius of curvature of copy 102 corresponds to that of image receiving material 29 and thereby results in a 1:1 read/write dimensional ratio in the line scan direction, the lines of video data may be extracted alternately from the memories at the data clock rate $f_1$, via electronic switches 158b and 163a or 163b. However if, as is shown in FIG. 2, the radius of curvature of copy 102 differs from that of reproduction material 29 (e.g., is twice as great) then the data readout rate must be reduced proportionately (e.g., by the inclusion of a 2:1 frequency divider 165 in data clock line $f_2$ to the memories) in order to preserve the 1:1 read/write dimensional relationship in the line scan direction. The substitution of other appropriate memory clock frequencies for $f_2$ would allow reproductions to be obtained at dimensional ratios other than 1:1 in the line scan direction and, if two such reader/writer units are operated in a transmit/receive facsimile mode, control of the reproduction ratio in the translational direction of scanning could be effected by introducing appropriate differences between their translational scanning rates.

Line-by-line synchronization of the memorized video data is obtained by releasing the reset line of the selected address counter 160 or 162 at the appropriate angular position during each revolution of scanning shaft 14, as determined by signals received over conductors 182 from program logic array 170. Also, an operator-adjusted switch 179 permits the address counters to be suitably enabled to allow video data to be read from memory in a reversed sequence (last in, first out), thereby causing a mirror image of copy 102 to be written by laser beam 98*a* in station 28. If required, the video data may be fed through a unity gain polarity inverter 164, via switch 166, before being sent to the driver amplifier 168 of acousto-optical modulator 85 to control the intensity of laser beam 98*a*, thereby allowing the writing of either a positive or a negative image on information receptive material 29. Also, if it is required to reproduce images from an original 102 having continuous tone characteristics this may be done either by feeding the analog video signals from preamplifier 155 direct to the input of the driver amplifier 168 of a linearized acousto-optical modulator 85 or, alternatively, by changing voltage comparator 156 to an N-bit parallel A-D converter, the output of which would be fed to an M-word, N-bit dual memory 159, 161 wherein each address location would contain the quantized grey level for one picture element of original 102. In the latter event it would also be possible to control the dimensions of the image recorded on material 29, as was previously described.

The speed of rotation and phase of scanning member 14 are stabilized by comparing, in phase detector 177, the once-per-revolution rotational error signal obtained on conductor 182 from program logic array 170 with a reference pulse obtained from frequency divider 176 by appropriately counting down the output frequency $f_1$ of clock 167. When these two signals are not coincident an error signal is developed which, after processing in circuit 178 in accordance with the procedures described in the previously mentioned phase-locked loop disclosure of Motorola, Inc., provides a control current on conductor 88 which is applied to an electrical bridge circuit comprised of rotary balance potentiometer 149, the operating coils of electro-pneumatic transducers 50, 54 and current limiting resistors 147, 148. When the bridge is balanced to minimize interaction between the rotary and linear control systems, any change in the error signal current provided by the rotary phase-locked control loop flows proportionately in each of transducer coils 50, 54 thereby causing a corresponding change in air pressure within each of chambers 11, 11*a* of cylinder 12. These balanced changes prevent translational motion of piston 13 and shaft 14 while, at the same time, allowing the rotational speed of shaft 14 to increase or decrease in response to the controlled variation in pneumatic pressure caused at orifices 22 of the air motor, thereby minimizing the magnitude of the rotational error.

The apparatus is typically prepared for operation by loading into station 25 the copy 102 which is to be read and transcribed; by loading into station 28 the image receptive material 29 to be written upon; by supplying appropriate electrical power and compressed air; and by setting switches 179, 166 to provide the desired orientation and polarity for the image which is to be written. Pneumatically-driven scanning member 14 is allowed to accelerate to its operational speed and to come under control of the rotary phase-locked loop 176, 177, 178. When the "start" command is given by the operator, member 14 translates under the control of signals derived from encoder pattern 27, 8 and ramp generator 172, and the output signals produced by photodetector 81 as copy 102 is scanned by reading laser beam 91*a* are fed—after signal processing—to modulator 85 of the writing laser beam 98. Beam 98*a* scans material 29 and exposes thereon a reproduction of part, or all, of the indicia contained in copy 102 to form the output record in writing station 28.

What is claimed is:
1. In a machine having a braking means:
 a. a shaft and means for rotating the same,
 b. means for pneumatically supporting said shaft and including an air bearing, said air bearing having an air supporting element and means for directing compressed air between said element and said shaft to support the shaft above the element and without touching the element,
 c. braking means for slowing the rotational speed of the shaft without the shaft coming into contact with said element,
 d. said shaft having a braking portion thereon, and
 e. said braking means comprising a stationary braking element and means for translating the shaft to bring said braking portion of said shaft into contact with said stationary braking element,
 said last-named means comprising air driven means for translating the shaft.
2. In a machine as defined in claim 1:
 said machine comprising scanning means for reading graphic indicia and writing means for writing the graphic data read by said scanning means,
 said writing means including a writing surface,
 said scanning means including a scanning element, mounted on said shaft, for scanning the graphic indicia, said scanning means having an output,
 means for producing a light beam,
 said writing means including a mirror, mounted on said shaft, for reflecting said beam to said writing surface to effect the writing of said indicia, and
 means controlling the intensity of said light beam according to the output from said scanning means.
3. In a machine having a braking means:
 a. a shaft and means for rotating the same,
 b. means for pneumatically supporting said shaft and including an air bearing, said air bearing having an air supporting element and means for directing compressed air between said element and said shaft to support the shaft above the element and without touching the element,
 c. braking means for slowing the rotational speed of the shaft without the shaft coming into contact with said element,
 d. said shaft having a braking portion thereon,
 e. said braking means comprising a stationary braking element and means for translating the shaft to bring said braking portion of said shaft into contact with said stationary braking element,
 f. said air bearing having a side wall transverse to the axis of said shaft,
 g. said braking element being mounted along said side wall of said air bearing, and
 h. said braking portion comprising an enlargement of said shaft diameter positioned to contact said braking element when said shaft is translated in one direction.
4. In a machine:
 a. a rotatable shaft and means for its rotation, b. pneumatic means for supporting said shaft comprising at least one air bearing, c. said air bearing comprising a supporting element beneath the shaft, and air supply means for passing compressed air between said element and said shaft to support the latter, d. a braking means for slowing the rotation of said shaft and bringing it to a stop before said shaft contacts said element, e. said braking means comprising two spaced brake elements, one of which is a part of said shaft and the other of which is stationary, and f. air driven means for translating said shaft to bring said braking elements into frictional contact to stop said shaft, said air supply means including means for maintaining the pneumatic pressure under said shaft high enough to hold said shaft out of contact with said air bearing until said shaft stops rotating.

5. A fail-safe protective system for a pneumatically operated machine as defined in claim 4, comprising, in combination:

a. an electrically powered source for supplying compressed air, and means for storing said compressed air, b. air pressure detecting means at the input and output of said storage means, and c. means associated with said detecting means for controlling the differential air pressure in said means for translating said shaft whereby, upon interruption of said air supply source, said shaft is translated to bring said brake elements into rotation-stopping frictional contact before the pneumatic pressure under said shaft falls below the value required to hold said shaft out of contact with said air bearing.

6. A fail-safe protective system for a pneumatically operated machine as defined in claim 5 wherein said means for controlling the differential air pressure in said translating means is electrically actuated by said detecting means, the improvement comprising means operable upon interruption of said electrical power whereby said shaft is translated to bring said brake elements into rotation-stopping frictional contact before the pneumatic pressure under said shaft falls below the value required to hold said shaft out of contact with said air bearing.

7. In a machine having braking means:

a. a rotating body solely supported by pneumatic means during operation, and having a horizontal longitudinal axis about which the body rotates, b. said body having a braking surface fixed thereto and located in a plane perpendicular to said axis, c. a stationary braking surface in a plane perpendicular to said axis and displaced along said axis from said first-named braking surface, and d. braking means for translating one of said braking surfaces along said axis to bring the braking surfaces into braking engagement with each other, e. said braking means including means to stop the motion of said body, when braking action is applied to the rotating body, while the body remains substantially completely pneumatically supported.

* * * * *